United States Patent
Foster et al.

(10) Patent No.: US 11,292,212 B2
(45) Date of Patent: Apr. 5, 2022

(54) HYBRID ADDITIVE MANUFACTURING

(71) Applicant: X Development LLC, Mountain View, CA (US)

(72) Inventors: Nicholas John Foster, Oakland, CA (US); Matthew David Day, Oakland, CA (US)

(73) Assignee: X Development LLC, Mountain View, CA (US)

( * ) Notice: Subject to any disclaimer, the term of this patent is extended or adjusted under 35 U.S.C. 154(b) by 597 days.

(21) Appl. No.: 16/157,750

(22) Filed: Oct. 11, 2018

(65) Prior Publication Data
US 2020/0114589 A1  Apr. 16, 2020

(51) Int. Cl.
| | |
|---|---|
| *B29C 69/02* | (2006.01) |
| *B33Y 10/00* | (2015.01) |
| *B33Y 50/02* | (2015.01) |
| *B29C 64/393* | (2017.01) |

(Continued)

(52) U.S. Cl.
CPC .............. *B29C 69/02* (2013.01); *B29C 51/46* (2013.01); *B29C 64/393* (2017.08); *B33Y 10/00* (2014.12); *B33Y 40/00* (2014.12); *B33Y 50/02* (2014.12)

(58) Field of Classification Search
CPC ....... B29C 64/10; B29C 64/393; B29C 69/00; B29C 69/02; B29C 51/02; B29C 51/08; B29C 51/46; B33Y 10/00; B33Y 40/00; B33Y 50/00; B33Y 50/02; B22F 3/1055; B22F 10/00; B22F 10/10; B22F 2003/1056
See application file for complete search history.

(56) References Cited

U.S. PATENT DOCUMENTS

| | | |
|---|---|---|
| 8,406,508 B2 | 3/2013 | Pollack et al. |
| 9,636,876 B2 | 5/2017 | Lee et al. |
| 10,016,661 B2 | 7/2018 | Madson et al. |
| (Continued) | | |

FOREIGN PATENT DOCUMENTS

WO   WO 2018/033632   2/2018

OTHER PUBLICATIONS

'www.formlabs.com' [online] "Chocolate Molds with 3D Printing & Vacuum Forming," Available on or before Nov. 20, 2017 via the wayback internet archive [retrieved on Dec. 27, 2018] Retrieved from Internet: URL<https://formlabs.com/blog/custom-chocolate-molds-3d-printing-vacuum-forming/> 7 pages.

(Continued)

*Primary Examiner* — Joseph S Del Sole
*Assistant Examiner* — Baileigh Kate Darnell
(74) *Attorney, Agent, or Firm* — Fish & Richardson P.C.

(57) ABSTRACT

Methods, systems, and apparatus, including computer programs stored on a computer-readable storage medium, for performing hybrid additive manufacturing. In some implementations, a hybrid additive manufacturing system causes a three-dimensional printer to print a sheet of material that includes printed features on one side of the sheet, each printed feature having a structural characteristic that is different from structural characteristics of a majority of the sheet. The system causes a molding machine to form the sheet using a mold, where at least one printed feature corresponds with an area of the mold at which the sheet deforms while being formed.

19 Claims, 7 Drawing Sheets

(51) Int. Cl.
*B33Y 40/00* (2020.01)
*B29C 51/46* (2006.01)

(56) References Cited

U.S. PATENT DOCUMENTS

| | | | |
|---|---|---|---|
| 2010/0314794 A1* | 12/2010 | Dietrich | B33Y 30/00 |
| | | | 264/219 |
| 2013/0241100 A1* | 9/2013 | Lownsdale | B29C 33/02 |
| | | | 264/101 |
| 2018/0085972 A1* | 3/2018 | Kyttanen | B29C 67/241 |
| 2018/0104863 A1 | 4/2018 | Cottrell et al. | |
| 2019/0016044 A1* | 1/2019 | Nistor | B33Y 40/00 |

OTHER PUBLICATIONS

'www.hindleys.com' [online] "Vacuum Forming Sheet (HIPS)," Available on or before Sep. 19, 2018, [retrieved on Dec. 27, 2018] Retrieved from Internet: URL< https://www.hindleys.com/shop-online/perspex-design-materials/vacuum-foiming-sheet-hips.html> 2 pages.

\* cited by examiner

HYBRID ADDITIVE MANUFACTURING

BACKGROUND

Many different types of products are formed by molding processes. For example, sheet molding processes, e.g., vacuum molding or metal pressing, can be used to form products ranging from packaging to vehicle interiors. Sheet molding processes can include vacuum molding, blow molding, and press molding techniques. Vacuum forming is a manufacturing method that is used to create objects having a height or depth by heating a sheet of substrate material, e.g., a plastic sheet, and then pulling the substrate over a mold. The resulting object is formed to the shape of the mold. If details or ornamentation are desired for the object, such details are either part of the mold, which can increase the cost and time spent creating the mold, or are attached to the product after molding, e.g., using an adhesive.

SUMMARY

In general, the disclosure relates to a hybrid additive manufacturing process. Additive manufacturing, also known as three-dimensional printing, refers to manufacturing techniques that form an object by depositing a material, e.g., metal, plastic, or other material, layer-by-layer to progressively build-up the object. Additive manufacturing techniques can be contrasted with subtractive manufacturing techniques which form an object by removing material from a solid block of material, e.g., machining and milling, to form the object. Hybrid additive manufacturing refers to techniques as described herein which use additive manufacturing to form some aspects of an object and another manufacturing technique, e.g., molding, to form other aspects of the object. For example, additive manufacturing can be used to partially form an object and a molding process can be used to complete the object.

More specifically, hybrid additive manufacturing processes described herein involve printing features on a sheet of molding material using a three-dimensional printer, where the features have a structural characteristic that is different from the rest of the sheet. For example, the printed features can be regions of the sheet that have an increased thickness, e.g., more printed layers, than the rest of the sheet. The features can be printed in regions of the sheet that correspond to areas of the sheet that will be deformed when the sheet is formed using a molding process, e.g., vacuum molding, blow molding, or press molding (e.g., metal pressing). For example, the features are printed in areas of the sheet that will stretch, wrinkle, or thin-out during the molding process. In other words, the features can be printed in regions of the sheet that will be weakened by deformation during the molding process. The features can, therefore, be printed with structural properties that will preemptively counter the expected deformation of the sheet within those regions. For example, the features can be printed with additional thickness, e.g., more printed layers or with layers having increased hardness or stiffness compared to the rest of the sheet. Such features can be referred to as "predistorted structural features."

Once printed, the sheet can be positioned on the mold by aligning the printed features with corresponding areas of the mold that are expected to cause the type of deformation for which the features were printed to preempt. The sheet is molded according to the mold using an appropriate molding process. For example, the sheet can be formed to the mold using vacuum molding, blow molding, or press molding.

In general, innovative aspects of the subject matter described in this specification can be embodied in methods that include the actions of causing a three-dimensional printer to print a sheet of material that includes printed features on one side of the sheet, each printed feature having a structural characteristic that is different from structural characteristics of a majority of the sheet; and causing a molding machine to form the sheet using a mold, where at least one printed feature corresponds with an area of the mold at which the sheet deforms while being formed. Other implementations of this aspect include corresponding systems, apparatus, and computer programs, configured to perform the actions of the methods, encoded on computer storage devices.

In another general aspect, innovative aspects of the subject matter described in this specification can be embodied in methods that include actions of controlling a three-dimensional printer to print a sheet of material that includes a printed feature on one side of the sheet, where the printed feature has a structural characteristic that is different from structural characteristics of a majority of the sheet by: obtaining data representing a region of the sheet that will deform when the sheet is formed on a mold, the region of the sheet corresponding with an area of the mold that will cause the region to deform, and causing the three dimensional printer to print the printed feature in the region of the sheet that will deform; controlling a molding machine to position the sheet over the mold such that the printed feature substantially aligns with the area of the mold; and controlling the molding machine to vacuum form the sheet on the mold. Other implementations of this aspect include corresponding systems, apparatus, and computer programs, configured to perform the actions of the methods, encoded on computer storage devices.

These and other implementations can each optionally include one or more of the following features.

Some implementations include controlling the molding machine to position a seal material over the sheet.

In some implementations, the structural characteristic of the printed feature includes an increased thickness of the material compared to the majority of the sheet. In some implementations, the printed feature includes more printed layers of the material than the majority of the sheet.

In some implementations, the structural characteristic includes a different hardness than the majority of the sheet.

In some implementations, the structural characteristic includes a different 3D printing material than a 3D printing material of the majority of the sheet.

In some implementations, the printed feature is an algorithmic predistortion of the sheet in the region which, when formed on the mold, will deform to substantially conform the structural characteristics of the majority of the sheet.

In some implementations, controlling the three-dimensional printer to print the sheet includes controlling the three-dimensional printer to print a second printed feature on the one side of the sheet, where the second printed feature includes an opacity that is different from an opacity of the majority of the sheet.

In some implementations, controlling the three-dimensional printer to print the sheet includes controlling the three-dimensional printer to print a second printed feature on the one side of the sheet, where the second printed feature protrudes from a surface on the one side of the sheet. In some implementations, the second printed feature is printed in a second region of the sheet, where the second region corresponds with a location of a design structure of a finished product.

Particular implementations of the subject matter described in this specification can be implemented so as to realize one or more of the following advantages. Implementations may provide a lower cost and more efficient process for adding details to sheet molded products. Implementations may improve the structural integrity of sheet molded products by preloading regions of a molding sheet with structural features that accommodate for stretching, wrinkling, or thinning of the material during molding. Implementations may permit the addition of various structural and/or aesthetic details to products formed using sheet forming techniques (e.g. vacuum forming, blow molding, and metal pressing) which might otherwise not be possible or require the use of mechanical fasteners or adhesives. For example, implementations can be used to add details such as windows, ribs, studs, threading, etc.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
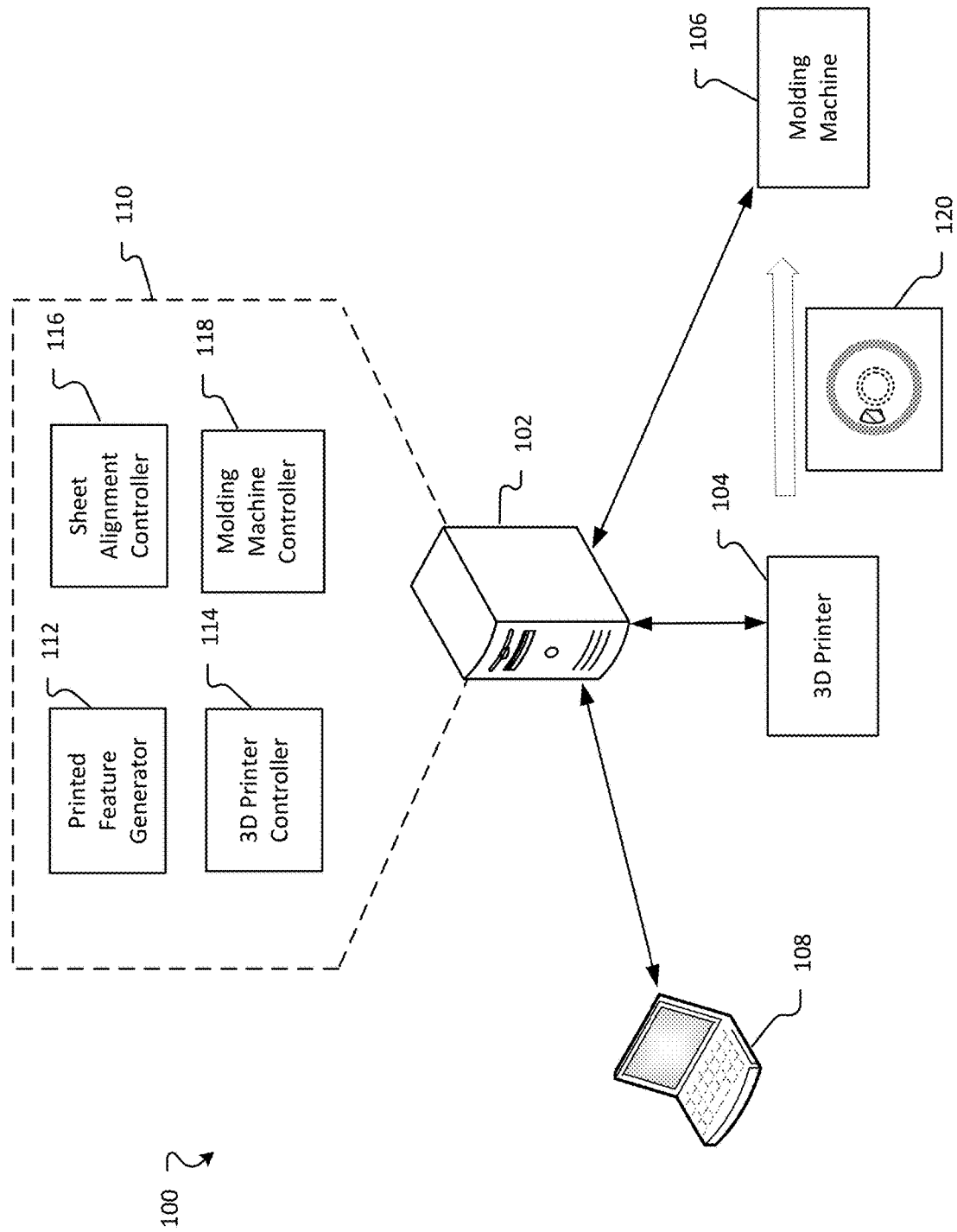
FIG. 1 is a diagram of an exemplary hybrid additive manufacturing system.

FIG. 1 is a diagram of an exemplary hybrid additive manufacturing system 100. The system 100 includes a control system 102, a three-dimensional (3D) printer 104, and a molding machine 106. 3D printer 104 can be, e.g., a Fused Deposition Modeling (FDM) printer or a Laminated Object Manufacturing (LOM) printer. Molding machine 106 can be, e.g., a vacuum forming machine, a blow molding machine, or a press molding machine (e.g., a metal pressing machine). Control system 102 can include a system of one or more computing devices.

Control system 102 is configured to control various aspects of a hybrid additive manufacturing process. For example, control system 102 can store and execute one or more computer instruction sets to control the execution of aspects of the hybrid additive manufacturing processes described herein. For example, control system 102 is in communication with 3D printer 104 and molding machine 106. Control system 102 can control the operations of 3D printer 104 and molding machine 106 to execute a hybrid additive manufacturing process.

In some implementations, the control system 102 can be operated or controlled from a user computing device 108. User computing device 108 can be a computing device, e.g., desktop computer, laptop computer, tablet computer, or other portable or stationary computing device.

Briefly, control system 102 can control the 3D printer 104 and molding machine 106 to perform a hybrid additive manufacturing process that involves printing a sheet of molding material 120 that includes one or more printed features, e.g., structural or design features. The structural or design features are different from the rest of the sheet, and then molding the sheet to form a molded object, e.g., a product. For example, control system 102 can control the 3D printer 104 to print structural features, which correspond to deformation areas of a mold, on a sheet of molding material 120. For example, the structural features can be regions of the sheet that have an increased thickness, e.g., more printed layers, than the rest of the sheet.

The structural features are printed in regions of the sheet 120 that correspond to areas of the sheet that will be deformed when the sheet 120 is formed by the molding machine 106, e.g., using a vacuum forming, blow molding, or press molding process. For example, the printed features can be printed in areas of the sheet 120 that will stretch, wrinkle, or thin-out during the molding process. In other words, the features can be printed in regions of the sheet 120 that will be weakened by deformation during the molding process. The features can therefore, be printed with structural properties that will preemptively counter the expected deformation of the sheet 120 within those regions. For example, the features can be printed with additional thickness, e.g., more printed layers or with layers having increased hardness or stiffness compared to the rest of the sheet 120. Such features can be referred to as "pre-distorted structural features."

A sheet of molding material 120 can be printed from 3D printing materials including, but not limited to, polymers, plastics, thermoplastics, resins, acrylic, metallic plastic (e.g., aluminide), a metal such as aluminum, steel, brass, copper, bronze, silver, gold, platinum, titanium, or a combination thereof. In some implementations, features can be printed using a different type of 3D printing material than the material used for the rest of the rest of the sheet 120. For example, a metal printed feature can be added to a polymer sheet 120.

Once the sheet of molding material 120 is printed, control system 102 can control the molding machine 106 to mold the sheet into a molded product. For example, control system 102 can position the sheet 120 on a mold by aligning the printed features with corresponding areas of the mold that are expected to cause the type of deformation for which the features were printed to preempt. Control system 102 can control molding machine 106 to form the sheet to the mold using vacuum molding or blow molding.

Figure 2A:
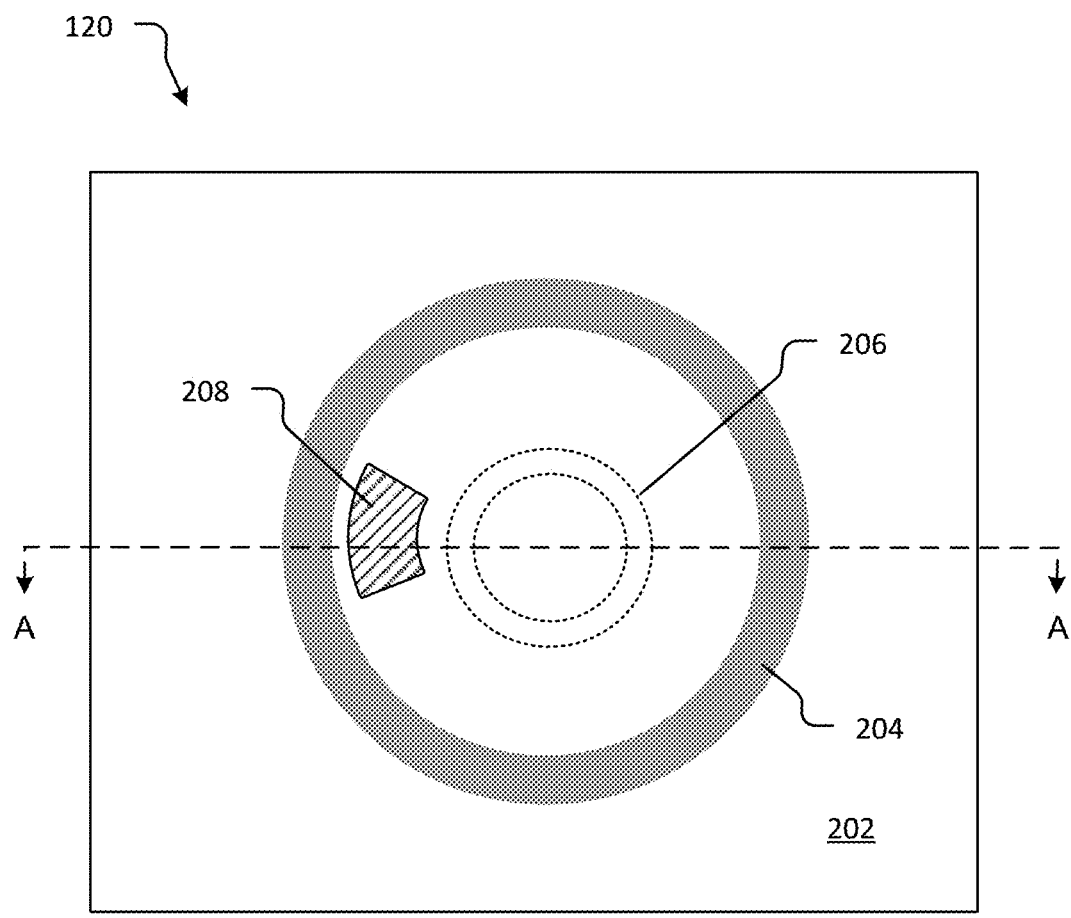
FIG. 2A is a top-view of an exemplary 3D-printed sheet of molding material that includes several exemplary printed features.
Figure 2B:
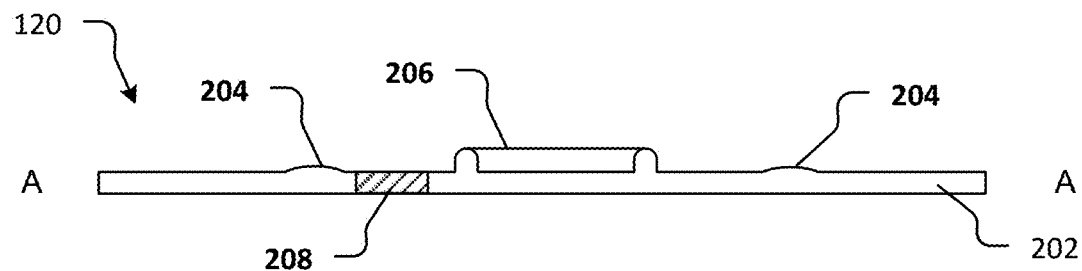
FIG. 2B is a cross-sectional view of the sheet of molding material in FIG. 2A taken along the line A-A.

FIGS. 2A and 2B illustrate a sheet of molding material 120 that includes several exemplary printed features 204, 206, 208 according to implementations of the present disclosure. As noted above, a 3D printed feature on a sheet of molding material 120 can include, but is not limited to, a structural or a design feature that has characteristics different from adjacent material 202 of the sheet 120 or characteristics different from a majority of the material 202 of the sheet 120. For example, a structural feature 204 can have a structural characteristic that is different from the majority of the material 202 in the sheet. Moreover, structural features 204 can be printed to correspond with regions of the sheet 120 that will deform more than the rest of the sheet 120 when molded.

Structural characteristics of structural features 204 can, in some implementations, be printed to moderate the effects of such deformation on the sheet 120 in the regions occupied by the structure features 204. For example, sharp corners or steep sidewalls of a mold can cause the sheet 120 to stretch, wrinkle, or thin-out during the molding process in certain regions more so than most of the sheet 120. Structural features 204 can be printed in regions of the sheet 120 that correspond to those areas of a mold that will cause increased deformation. Structural features 204 can have structural characteristics different from those of the rest of the sheet that include, but are not limited to, an increased thickness of the printed material, additional printed layers of material, a different hardness, a different type of material, or a combination thereof. In some implementations, a structural feature 204 is an algorithmically determined predistortion of the sheet 120 which, when formed on the mold, will be deformed to substantially conform the structural characteristics of the rest of the sheet 120.

Design features 206, 208 can be, e.g., aesthetic or functional features that are generally difficult to form from a molding process alone. For example, a foot design feature 206 can be printed as a protrusion extending from one side of the sheet of molding material 120. If the foot design feature 206 were formed by a molding alone (e.g., by vacuum molding), the foot would be reflected on the other side of the sheet 120 as a corresponding groove, e.g., on the inside of a bowl (e.g., see the bowl in FIG. 3B). Alternatively, the foot would have to be attached to the molded product (after molding) using an adhesive. However, when the foot design feature 206 is 3D printed as a protrusion onto one side of a sheet of vacuum molding material, the foot can be formed as an integral feature of a final molded product without having a corresponding groove on the opposite side of the sheet or without the need to attached the foot after molding the product.

Another exemplary design feature is a window design feature 208. For example, a region of the sheet of molding material 120 can be printed using a different material or a different opacity of material from the rest of the material 202 in the sheet 120. Such a technique can be used, e.g., to form a window design feature 208.

Referring again to FIG. 1, in some implementations, control system 102 can include a set of operations modules 110 for controlling different aspects of a hybrid additive manufacturing process. The operation modules 110 can be provided as one or more computer executable software modules or hardware modules. The operation modules can include a printed feature generator 112, a 3D printer controller 114, a sheet alignment controller 116, and a molding controller 118.

Printed feature generator 112 identifies regions of a sheet of molding material 120 on which to print 3D printed features (e.g. printed features 204, 206, 208 of FIG. 2). For example, the control system 102 can obtain a Computer Aided Design (CAD) file of a final product or a CAD file of a mold on which the printed sheet is to be molded. For example, a user can send a CAD file from a user computing device 108 to the control system 102. Printed feature generator 112 can generate instructions for controlling the 3D printer 104 to print a sheet of molding material 120 with appropriate printed features based on the CAD file. In some implementations, the printed feature generator 112 can generate an Additive manufacturing File (AMF) for controlling the operations of the 3D printer 104 based on a CAD file.

For example, printed feature generator 112 can identify design features (such as design features 206, 208 of FIG. 2) from a CAD file of a final product or a mold on which the sheet 120 will be molded. Printed feature generator 112 can identify regions of the sheet 120 on which to print the design features such that, after vacuum molding, blow molding, or press molding the sheet 120, the design features will be formed in the correct location of the final product. Printed feature generator 112 can determine appropriate dimensions for printing the design features. Printed feature generator 112 can determine appropriate material characteristics for printing the design feature. The material characteristics of the design feature can include, but are not limited to, type of material, material hardness, material stiffness, opacity, or a combination thereof.

As another example, printed feature generator 112 can identify regions of the sheet 120 in which to print structural features (such as structural feature 204 of FIG. 2). For example, printed feature generator 112 can identify areas of a mold that will cause increased deformation of the sheet 120 when the sheet 120 is molded by the mold. For example, printed feature generator can identify such areas of the mold based on a CAD file of the mold. Areas of a mold that can cause increased deformation of a sheet of molding material 120 can include, but are not limited to, steep sidewalls, sharp corners, and deep mold sections (e.g., the sides of a deep bowl shape). For example, such areas of a mold may tend to cause increased deformations in the sheet 120 that include, but are not limited to, more stretching, wrinkling, or thinning of the material as compared to the rest of the sheet 120. Printed feature generator 112 can generate instructions for printing structural features in the identified regions of the sheet that will likely undergo increased deformation during molding, e.g., to prevent excessive stretching, wrinkling, or thinning of the sheet 120 in those regions during molding.

Printed feature generator 112 can determine appropriate dimensions for printing the structural features. Printed feature generator 112 can determine appropriate material characteristics for printing the structural features. The material characteristics of the structural features can be enhanced structural characteristics that include, but are not limited to, an increased thickness of the printed material, additional printed layers of material, a different hardness, a different type of material, or a combination thereof. For example, by identifying the regions of the sheet that will undergo increased deformation and determining appropriate structural characteristics for such features, printed feature generator 112 can determine algorithmic predistortions of the sheet in these regions to be printed as structural features which, when formed on the mold, will deform to substantially conform the structural characteristics of the rest of the sheet. For example, the structural features can be printed with structural characteristics such that, after vacuum molding, blow molding, press molding the sheet 120, the structural features will have structural characteristic substantially similar to the rest of the molded product. In other words, the increased stretching of the regions of the sheet in which the structural features are printed will deform the enhanced structural characteristics such that they conform more closely to structural characteristics of the rest of the product.

Printed feature generator 112 can generate an AMF for controlling the operations of the 3D printer 104 to print the sheet of molding material 120 to include appropriate printed features, e.g., design features, structural features, or both.

3D printer controller 114 controls the 3D printer 104 to print the sheet of molding material 120 with one or more printed features. For example, 3D printer controller 114 can provide instructions to the 3D printer 104 that cause the 3D printer to print the sheet of molding material 120 with printed features according to an AMF generated by the printed feature generator 112. In some implementations, the 3D printer controller 114 can obtain an AMF for printing a sheet of molding material with printed features from user computing device 108.

Figure 3A:
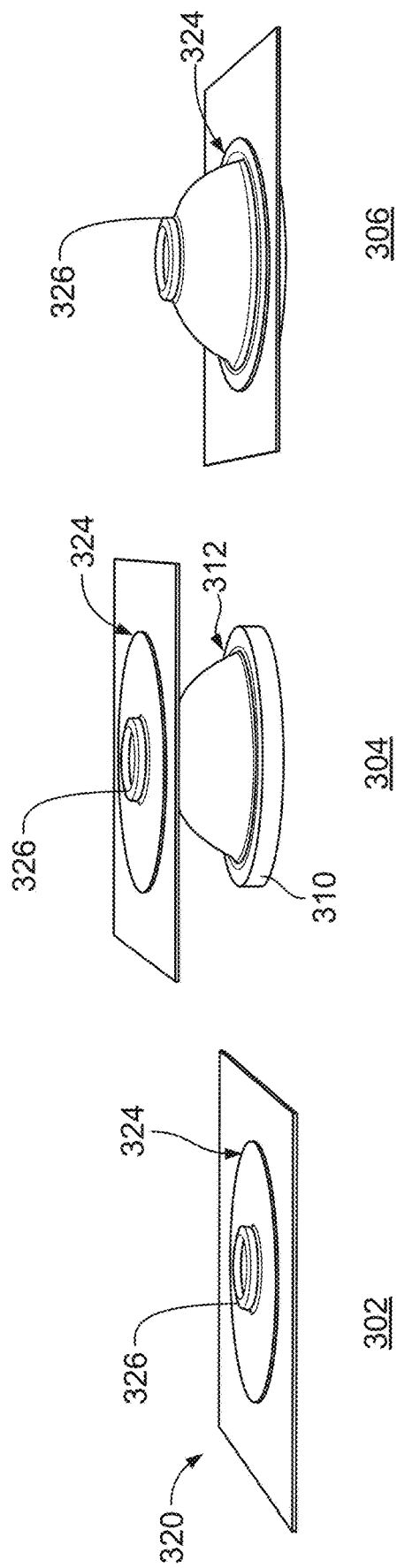
FIG. 3A depicts a series of diagrams illustrating a molded product at different stages of a hybrid additive manufacturing process.

For example, diagram 302 of FIG. 3A illustrates an exemplary sheet of molding material 320 printed by 3D printer 104. The sheet 320 includes two exemplary printed features: a structural feature 324 and a foot 326, e.g., as a design feature. The structural feature 324 is printed with a thickness slightly greater than other portions of the sheet 320 to account for additional stretching of the sheet material that will occur when the sheet 320 is stretched over the relatively steeper sides 312 near the bottom of a bowl mold 310 as illustrated in diagram 304.

Figure 3B:
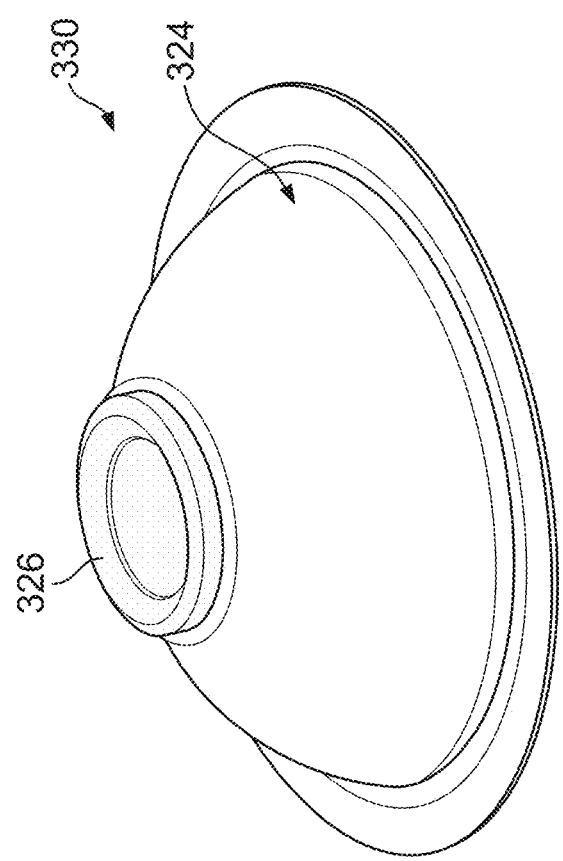
FIG. 3B depicts two perspective views of an exemplary product produced by a hybrid additive manufacturing process.
Figure 3B:
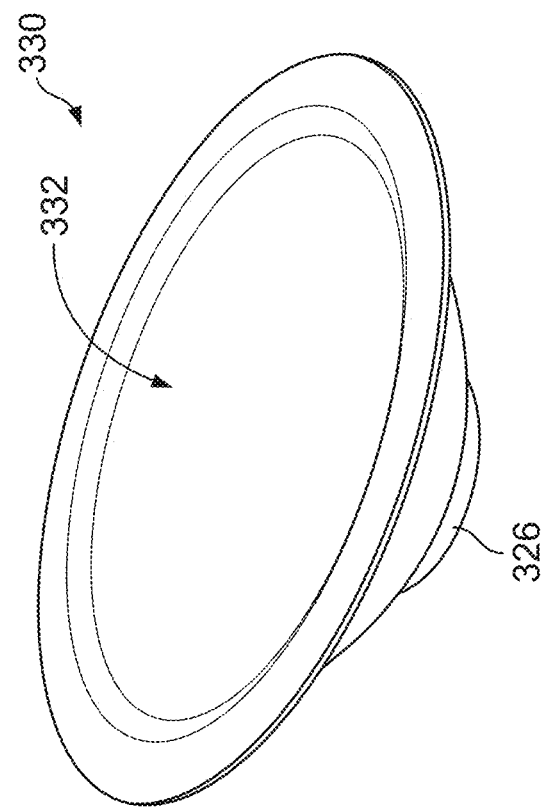

The foot 326 represents a printed design feature for a bowl (bowl 330 in FIG. 3B). The foot 326 is printed as a protrusion extending outward from the top-side of the sheet of molding material 320. However, unlike products formed using sheet molding techniques alone, the inside surface 332 of the bowl is smooth and does not include groove that would correspond with a protrusion in a mold 310 to produce the foot 326.

Sheet alignment controller 116 aligns a printed sheet of molding material 320 with a mold 310, e.g., as illustrated in diagram 304 of FIG. 3A. For example, sheet alignment controller 116 can control molding machine 106 to properly align the sheet 320 with a vacuum forming mold 310. For example, sheet alignment controller 116 can send control signals or instructions to control molding machine 106 to align printed structural features 324 of the sheet 320 with corresponding areas of the mold 310 that will deform the structural features 324 during the molding process. As another example, sheet alignment controller 116 can align printed design features, e.g., foot 326, with appropriate areas of the mold in order to correctly form the desired product, e.g., bowl 330. For example, sheet alignment controller 116 can align the foot 326 with the area of the mold 310 that will form the bottom of bowl 330, where the foot 326 should be located.

In some implementations, the mold 310, the printed sheet 320, or both can include alignment guides to aid the sheet alignment controller 116 with aligning the sheet 320 to the mold 310. For example, alignment guides can include, but are not limited to, shaped holes at edges of the sheet 320, e.g., cross-hairs, and corresponding optically identifiable shapes on the mold 310 such that an optical sensor can be used to detect alignment between the alignment guides on the sheet 320 with those on the mold 310.

In some implementations, a seal material may be needed over the sheet of molding material 320 to perform vacuum molding. Some types of 3D printed sheets may be slightly porous so as to permit limited airflow through the sheet. Thus, in order to vacuum form such types of materials, a seal material can be placed over the printed sheet of molding material 320 prior to vacuum forming the sheet. For example, sheet alignment controller 116 can control molding machine 106 to position a seal material over the sheet. The seal material can include, but is not limited to, a sheet of impermeable material.

Molding controller 118 controls molding machine 106 to perform an appropriate molding process, e.g., as illustrated in diagram 306 of FIG. 3A. For example, molding controller 118 can send control signals or instructions to molding machine 106 to start a vacuum molding process once the printed sheet of molding material 320 is properly aligned with the mold 310. A vacuum forming process can include, e.g., heating the sheet 320 to an appropriate forming temperature and applying a vacuum to form the sheet 320 over the surface of the mold 310.

Figure 4A:
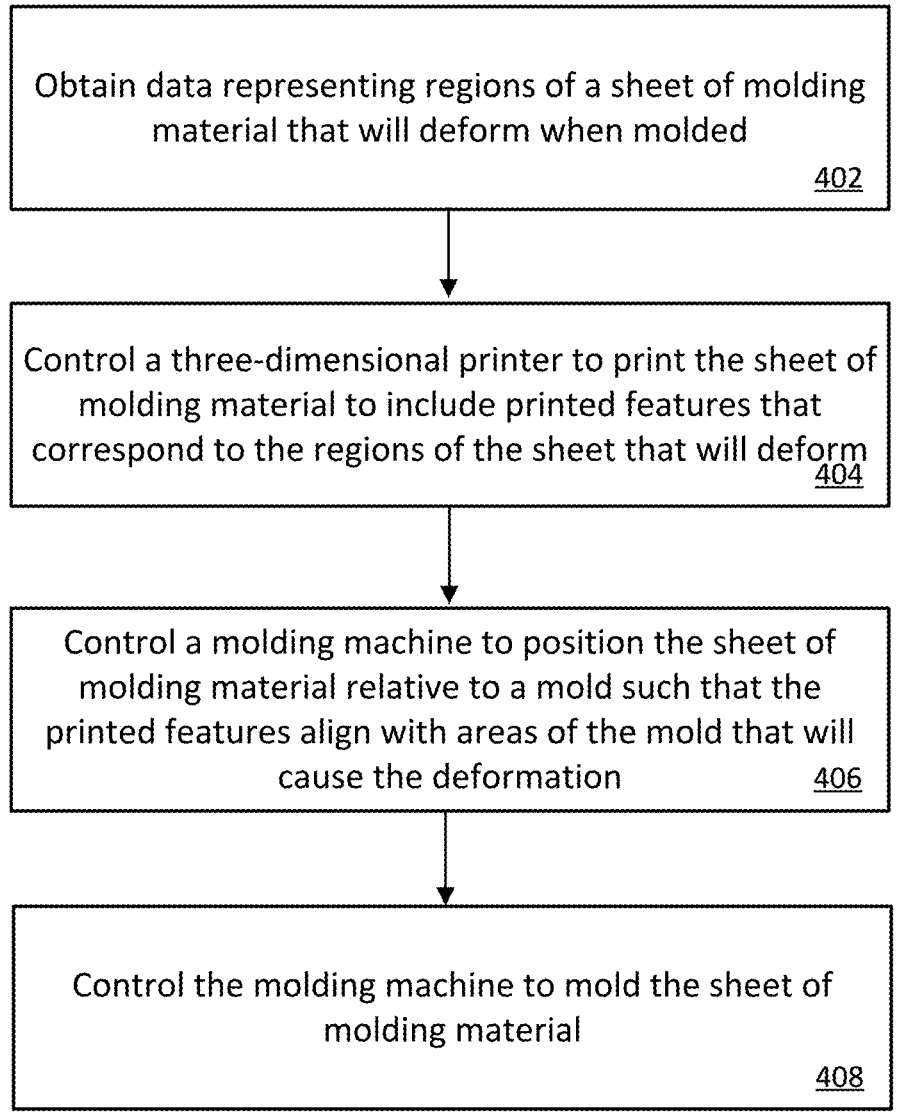
FIGS. 4A and 4B are a flow diagrams that illustrates example processes for selecting a modality for interfacing between an autonomous device and a user.
Figure 4B:
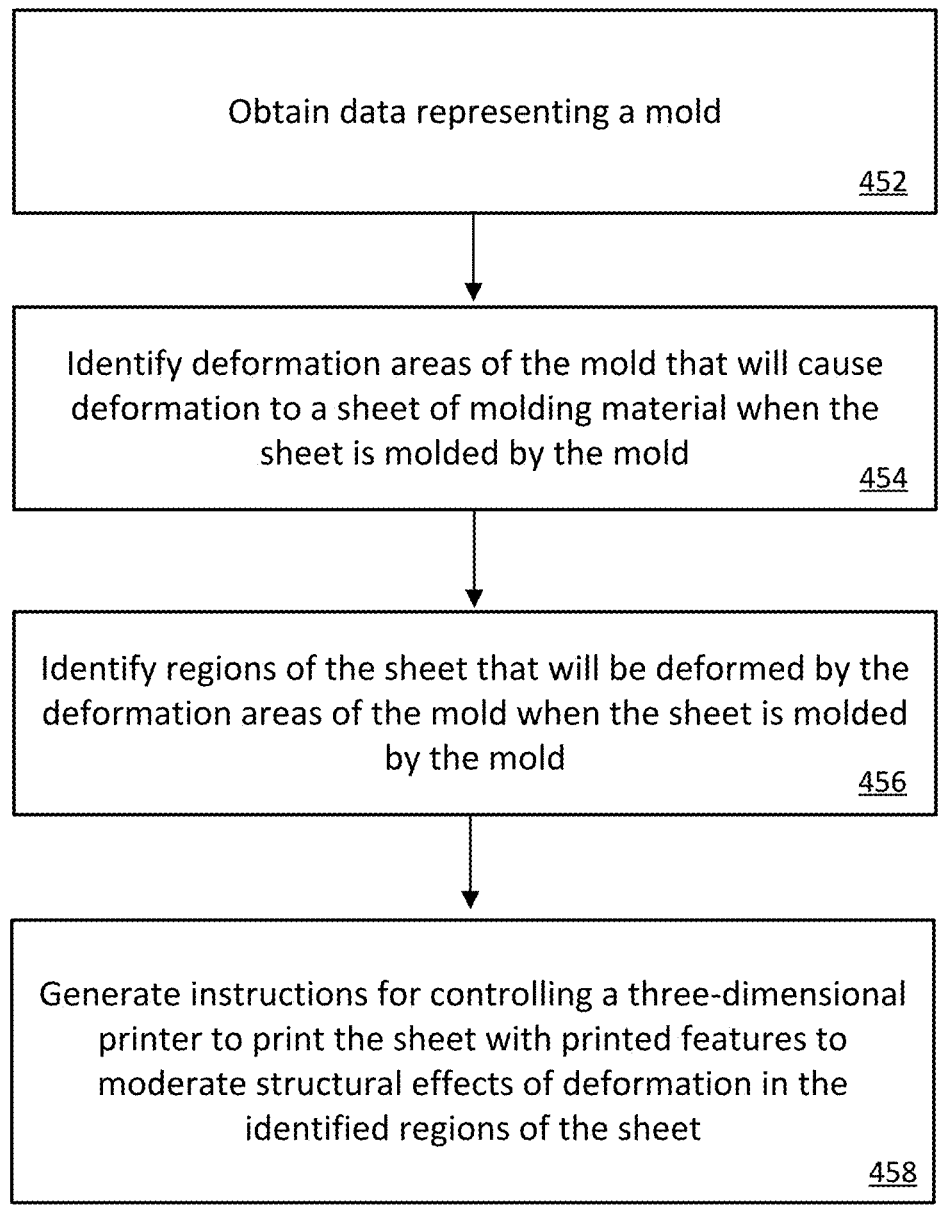

FIGS. 4A and 4B are flow diagrams that illustrate a processes 400 and 450 for interfacing between an autonomous device and a user. The processes 400 and 450 can be performed by one or more computing devices. For example, as discussed above, the processes 400, 450 may be performed by control system 102 of FIG. 1. For convenience, operations of process 400, 450 are described as being performed by a computing system. However, as noted above, some or all of the operations may be performed by various operation modules of a hybrid additive manufacturing control system.

The computing system obtains data representing regions of a sheet of molding material that will deform when molded (402). For example, the computing system can obtain a CAD file of a molded product or of a mold for molding the product. For example, a CAD file of a product can include data (e.g., meta data) indicating regions of the product that are likely to undergo increased deformation in during a molding process of a sheet of molding material used to make the product. A CAD file of a mold can include data (e.g., meta data) indicating areas of the mold that are likely to cause increased deformation in regions of a sheet of material during a molding process. Such increased deformation in one or more regions of a sheet relative to other regions of the sheet that is caused by molding can include, but is not limited to, increased stretching, wrinkling, or thinning the sheet of molding material.

The computing system can generate an AMF for controlling a three-dimensional printer to print a sheet of molding material with printed features that mitigate the effects of such increased deformation on the resulting structure of the final product. For example, the computing system can generate an AMF that includes structural features that will be printed with structural characteristics to mitigate the effects of increased deformation in regions of the sheet that correspond with areas of a mold that will cause the increased deformation during molding. Structural characteristics of structural features can include, but are not limited to, an increased thickness of the printed material, additional printed layers of material, a different hardness, a different type of material, or a combination thereof.

The computing system controls a three-dimensional printer to print the sheet of molding material to include printed features that correspond to the regions of the sheet that will deform (404). For example, the computing system transmits control signals or instructions to the three-dimensional printer to print the sheet of molding material according to an AMF that includes the printed features. The computing system can control the three-dimensional printer to apply and fuse sequential layers of the sheet of printed material according to 3D printing process such as FDM or LOM.

The computing system controls a molding machine to position the sheet of molding material relative to a mold such that the printed features align with areas of the mold that will cause the deformation (406). For example, the computing system transmits control signals or instructions to the molding machine to properly align the sheet of molding material with a mold. The computing system can control the molding machine to align printed structural features of the sheet with corresponding areas of the mold that will deform the structural features during the molding process. In some implementations, the computing system can employ input from sensors used to detect the alignment between alignment guides on the sheet with corresponding alignment guides on the mold.

The computing system controls the molding machine to mold the sheet of molding material (408). For example, the computing system transmits control signals or instructions to the molding machine to control one or more operations of the molding machine during a molding process. For example, the computing system can control the molding machine to start a vacuum molding process once the printed sheet of molding material is properly aligned with the mold. The computing system can control the molding machine to heat the sheet to an appropriate forming temperature for performing vacuum molding, blow molding, or press molding. The computing system can control the molding machine to apply a vacuum to form the sheet over the surface of the mold. In some implementations, the computing system can control the molding machine to inject air onto a surface of the sheet to press the sheet against the surface of the mold, e.g., according to a blow molding process.

In some implementations, the computing system can identify areas of a mold, e.g., based on a CAD file of the mold, that are likely to cause increased stretching, wrinkling, or thinning of a sheet of molding material during a molding process. FIG. 4B provides a flowchart of an exemplary process 450 for identifying such regions and producing printed features on a sheet of molding material to mitigate the effects of such increased deformation in a final product.

The computing system can obtain data representing a mold (452). For example, the computing system can obtain a CAD file of the mold from a user computing device, e.g., user computing device 108 of FIG. 1. The computing system can identify deformation areas of the mold that will cause deformation to a sheet of molding material when the sheet is molded by the mold (454). For example, the computing system can identify areas of the mold, e.g., sharp corners and steep sidewalls of the mold, that are likely to cause increased deformation of the sheet during molding. As noted above, such increased deformation of the sheet may include increased stretching, wrinkling, or thinning of the sheet. For example, the computing system can identify the areas of the mold that are likely to cause increased deformation from the CAD file of the mold.

The computing system can identify regions of the printed sheet of molding material that will be deformed by the deformation areas of the mold when the sheet is molded by the mold (456). For example, the computing system can use dimensions of the mold from the CAD file of the mold to identify which regions of the sheet will be formed on the identified areas of the mold that are likely to cause the increased deformation of the sheet. The computing system can identify appropriate structural features to include in these regions of the sheet to mitigate the effects of the increased deformation that is likely to occur. For example, the computing system can determine appropriate material characteristics for printing the structural features. The material characteristics of the structural features can be enhanced structural characteristics that include, but are not limited to, an increased thickness of the printed material, additional printed layers of material, a different hardness, a different type of material, or a combination thereof.

For example, by identifying the regions of the sheet that will undergo increased deformation and determining appropriate structural characteristics for such features, the computing system can determine algorithmic predistortions of the sheet in these regions to be printed as structural features which, when formed on the mold, will deform to substantially conform the structural characteristics of the rest of the sheet. For example, the computing system can add a structural feature that includes additional layers of printed material in a region of the sheet that corresponds to an area of the mold with steep sidewalls. When additional layers of printed material may, therefore, mitigate increased thinning of the sheet that would likely occur as the sheet is stretched along the steep sidewall of the mold. Thus, the sheet may be thinned during molding to achieve a thickness that is substantially similar to the thickness of surrounding regions of the molded product that experience less stretching during the molding process.

The computing system can generate instructions for controlling a three-dimensional printer to print the sheet with printed features to moderate structural effects of deformation in the identified regions of the sheet (458). For example, the computing system can generate an AMF for controlling the operations of the three-dimensional printer to print the sheet of molding material to include appropriate printed features, e.g., design features, structural features, or both.

Figure 5:
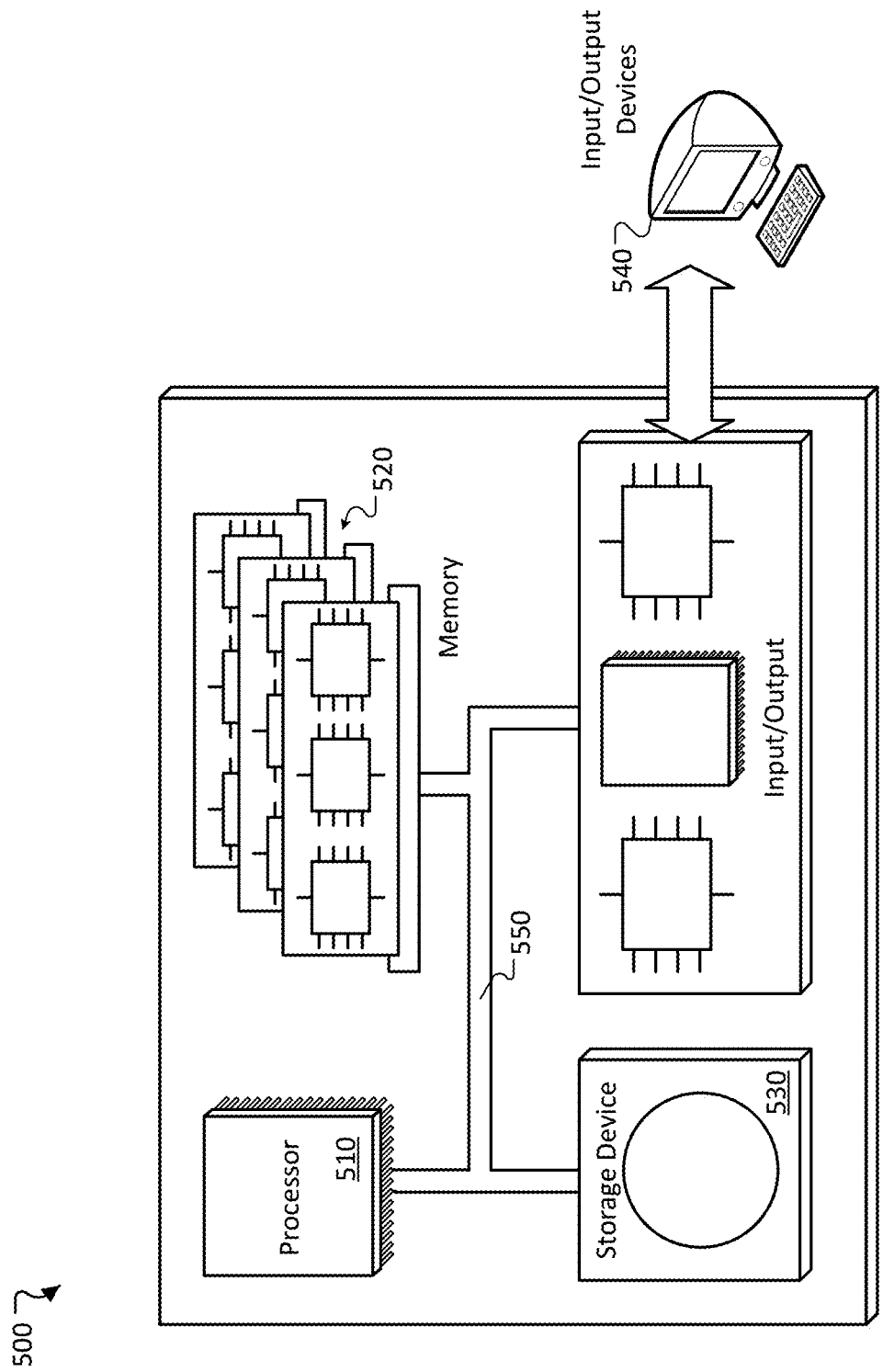
FIG. 5 depicts a schematic diagram of a computer system that may be applied to any of the computer-implemented methods and other techniques described herein.

FIG. 5 is a schematic diagram of a computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 500) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented hybrid additive manufacturing method comprising:

causing, by one or more processors, a three-dimensional printer to print a sheet of a material, the sheet comprising a printed feature on one side of the sheet, the printed feature having a structural characteristic that is different from structural characteristics of a majority of the sheet, and wherein the printed feature comprises a predistortion of the sheet in a region which, when formed on a mold, will deform to substantially conform with structural characteristics of the majority of the sheet; and causing, by the one or more processors, a molding machine to form the sheet using the mold, wherein the printed feature corresponds with an area of the mold at which the sheet deforms while being molded.

2. The method of claim 1, wherein the structural characteristic of the printed feature includes an increased thickness of the material compared to the majority of the sheet.

3. The method of claim 2, wherein the printed feature includes more printed layers of the material than the majority of the sheet.

4. The method of claim 1, wherein the structural characteristic of the printed feature includes a different hardness than the majority of the sheet.

5. The method of claim 1, wherein the printed feature comprises an algorithmic predistortion.

6. The method of claim 1, wherein causing the three-dimensional printer to print the sheet comprises causing the three-dimensional printer to print a second printed feature on the one side of the sheet, the second printed feature comprising an opacity that is different from an opacity of the majority of the sheet.

7. The method of claim 6, wherein the second printed feature comprising an opacity that is different from an opacity of the majority of the sheet is a window printed feature.

8. The method of claim 7, wherein the window printed feature comprises a lower opacity than the majority of the sheet.

9. The method of claim 1, wherein causing the three-dimensional printer to print the sheet comprises causing the three-dimensional printer to print a second printed feature on the one side of the sheet, wherein the second printed feature protrudes from a surface on the one side of the sheet.

10. The method of claim 9, wherein the second printed feature is printed in a region of the sheet, the region corresponding with a location of a design structure of a finished product.

11. A computer-implemented hybrid additive manufacturing method comprising:

controlling, by one or more processors, a three-dimensional printer to print a sheet of a material, the sheet comprising a printed feature on one side of the sheet, the printed feature having a structural characteristic that is different from structural characteristics of a majority of the sheet, and wherein the printed feature comprises a predistortion of the sheet in a region which, when formed on a mold, will deform to substantially conform with structural characteristics of the majority of the sheet, wherein controlling comprises:

obtaining data representing a region of the sheet that will deform when the sheet is formed on the mold, the region of the sheet corresponding with an area of the mold that will cause the region to deform, and causing the three-dimensional printer to print the printed feature in the region of the sheet that will deform;

controlling, by the one or more processors, a molding machine to position the sheet over the mold such that the printed feature substantially align with the area of the mold; and controlling, by the one or more processors, the molding machine to vacuum form the sheet on the mold.

12. The method of claim 11, further comprising controlling the molding machine to position a seal material over the sheet.

13. The method of claim 12, wherein the printed feature includes more printed layers of the material than the majority of the sheet.

14. The method of claim 11, wherein the structural characteristic of the printed feature includes an increased thickness of the material compared to the majority of the sheet.

15. The method of claim 11, wherein the structural characteristic includes a different 3D printing material than a 3D printing material of the majority of the sheet.

16. The method of claim 11, wherein the printed feature is an algorithmic predistortion.

17. The method of claim 11, wherein controlling the three-dimensional printer to print the sheet comprises controlling the three-dimensional printer to print a second printed feature on the one side of the sheet, the second printed feature comprising an opacity that is different from an opacity of the majority of the sheet.

18. The method of claim 11, wherein controlling the three-dimensional printer to print the sheet comprises controlling the three-dimensional printer to print a second printed feature on the one side of the sheet, wherein the second printed feature protrudes from a surface on the one side of the sheet.

19. The method of claim 18, wherein the second printed feature is printed in a second region of the sheet, the second region corresponding with a location of a design structure of a finished product.

* * * * *